(12) United States Patent
Kajiwara et al.

(10) Patent No.: US 8,265,716 B2
(45) Date of Patent: Sep. 11, 2012

(54) MOBILE TERMINAL DEVICE

(75) Inventors: Yoshifumi Kajiwara, Kawasaki (JP);
Toshikazu Ishioka, Kawasaki (JP);
Hiroyuki Takita, Kawasaki (JP);
Manabu Matsushima, Kawasaki (JP);
Kenta Sugimori, Kawasaki (JP);
Haruyoshi Yada, Kawasaki (JP);
Kazunobu Yoneyama, Kawasaki (JP);
Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 12/399,553

(22) Filed: Mar. 6, 2009

(65) Prior Publication Data
US 2009/0247236 A1 Oct. 1, 2009

(30) Foreign Application Priority Data
Mar. 31, 2008 (JP) .................................. 2008-093084

(51) Int. Cl.
*H04M 1/00* (2006.01)
(52) U.S. Cl. ................. 455/575.3; 455/575.1; 455/575.8
(58) Field of Classification Search .......................... None
See application file for complete search history.

(56) References Cited

U.S. PATENT DOCUMENTS

| 2005/0141186 A1* | 6/2005 | Shimizu .......................... 361/683 |
| 2006/0012969 A1* | 1/2006 | Bachman ......................... 361/816 |
| 2006/0038019 A1 | 2/2006 | Kajiwara et al. |
| 2006/0140438 A1* | 6/2006 | Kimura et al. ................. 381/431 |
| 2006/0171107 A1* | 8/2006 | Yamamoto et al. ........... 361/683 |
| 2009/0087655 A1* | 4/2009 | Yamada et al. ................ 428/354 |

FOREIGN PATENT DOCUMENTS
JP    2006-60396    3/2006
WO    WO 2006123616 A1 *  11/2006

* cited by examiner

*Primary Examiner* — Ajit Patel
(74) *Attorney, Agent, or Firm* — Staas & Halsey LLP

(57) ABSTRACT

A mobile terminal device including a movable side housing includes a movable side front case and a movable side rear case providing an LCD module is provided. The mobile terminal device includes a fixed side housing connected to the movable side housing with a connecting hinge, a frame member integrally fitted on a peripheral portion of the movable side front case, a display panel provided on the frame member by adhering to a peripheral portion of the frame member with double-sided adhesive tape, and a dust-proof sheet member in contact with the frame member, and positioned to an upper surface of the LCD module.

7 Claims, 9 Drawing Sheets

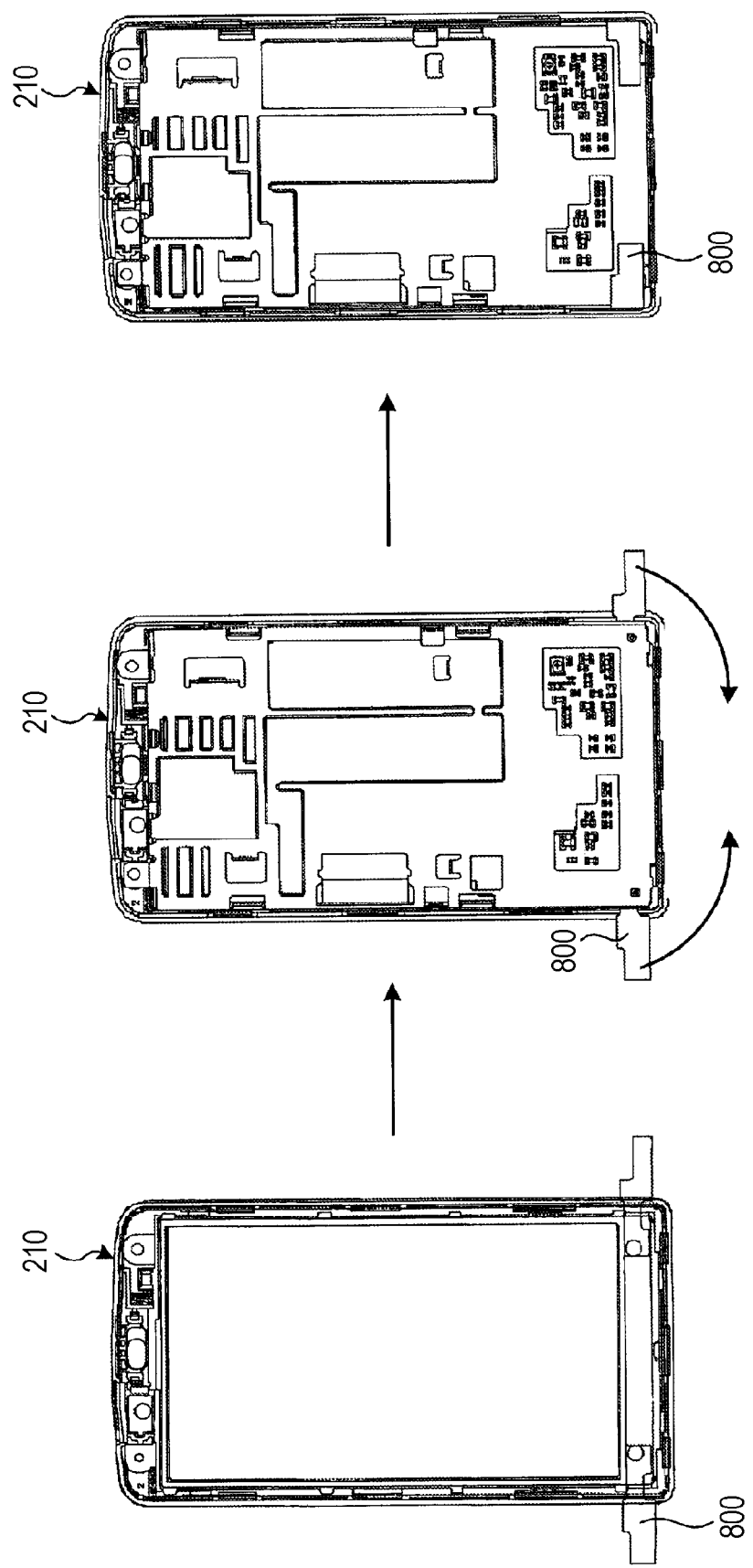

MOBILE TERMINAL DEVICE

CROSS-REFERENCE TO RELATED APPLICATIONS

This application is based upon and claims the benefit of priority of the prior Japanese patent application No. 2008-093084, filed on Mar. 31, 2008, the entire contents of which are incorporated herein by reference.

FIELD

The embodiments discussed herein are directed to a mobile terminal devices including liquid crystal display (LCD) panels.

BACKGROUND

Mobile terminal devices can include a movable side housing and a fixed side housing, which are foldably connected to each other with a connection part, and a relatively large LCD panel. An example of such a mobile terminal device is a mobile phone. An LCD panel can be secured to a mobile phone body by making the LCD panel adhere to a movable side front case of the mobile phone with double-sided tape interposed therebetween.

To prevent dust from entering the interior of the movable side housing of the mobile phone, such an LCD panel can be provided with a dust-proof packing member that can be made to adhere and secured thereto. An example of the packing member is a dust-proof sheet member.

However, since the thickness and size of the mobile phone have become smaller while the LCD module thereof has become larger, in the known mobile phone has become difficult to form a member to which the panel for protecting the LCD module can be made to adhere with a required thickness in known methods such as those employing resin or die-cast members. In the known mobile phones, a portion to which the LCD panel can be made to adhere does not be provided with a sufficiently large area.

Therefore, the known mobile telephone sometimes caused loosening and separation of the LCD panel because the adhesion of double-sided tape is insufficient. Additionally, in the known mobile phones, since the portion to which the dust-proof sheet member is made to adhere does not be provided with a sufficiently large area, dust sometimes enter the interior of the mobile phone body.

With the reduction in thickness of the movable side front case in which the LCD panel is disposed, the known mobile phones have a possibility of causing damage to the LCD panels and the LCD modules thereof because in a mobile phone, conventionally it is difficult to give sufficient rigidity to members disposed around the LCD panels.

A problem in the securing of the LCD panel conventionally, in a mobile phone is illustrated in FIG. 1.

A mobile phone illustrated in FIG. 1 includes an LCD panel 211*a* and an LCD module 600 provided in a movable side front case 210. The LCD panel 211*a* can be secured to the movable side front case 210 with a double-sided tape member 300*a* interposed therebetween. The LCD module 600 can be made to adhere to the back surface of the LCD panel 211*a* only with a dust-proof sheet member 500*a* interposed therebetween.

The LCD panel 211*a* can be subjected to a reaction force of the double-sided tape member 300*a* in the upward direction in FIG. 1. In addition, the area of a portion to which the double-sided tape member 300*a* can be made to adhere can be small. Therefore, a problem that the LCD panel 211*a* can be loosened and separated, for example, may occur.

As illustrated in FIG. 1, the portion of the movable side front case 210 to which the double-sided tape member 300*a* can be made to adhere and the portion of the LCD panel 211*a* to which the dust-proof sheet member 500*a* can be made to adhere are both small. Consequently, the adhesions of the double-sided tape member 300*a* and the dust-proof sheet member 500*a* become small.

SUMMARY

Accordingly, it is an object in one aspect of the embodiments discussed herein to provide a mobile terminal device in which loosening and separation of an LCD panel can be prevented.

It is another object in one aspect of the embodiments discussed herein to provide a mobile terminal device in which a sufficient rigidity can be maintained.

According to an aspect of the embodiment, a mobile terminal device including a movable side housing including a movable side front case and a movable side rear case providing an LCD module, a fixed side housing connected to the movable side housing with a connecting hinge, a frame member integrally fitted on a peripheral portion of the movable side front case, a display panel provided on the frame member by adhering to a peripheral portion of the frame member with double-sided adhesive tape, and a dust-proof sheet member in contact with the frame member, and positioned to an upper surface of the LCD module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 illustrates positions where pieces of conductive tape are provided.

DESCRIPTION OF EMBODIMENTS

Figure 1:
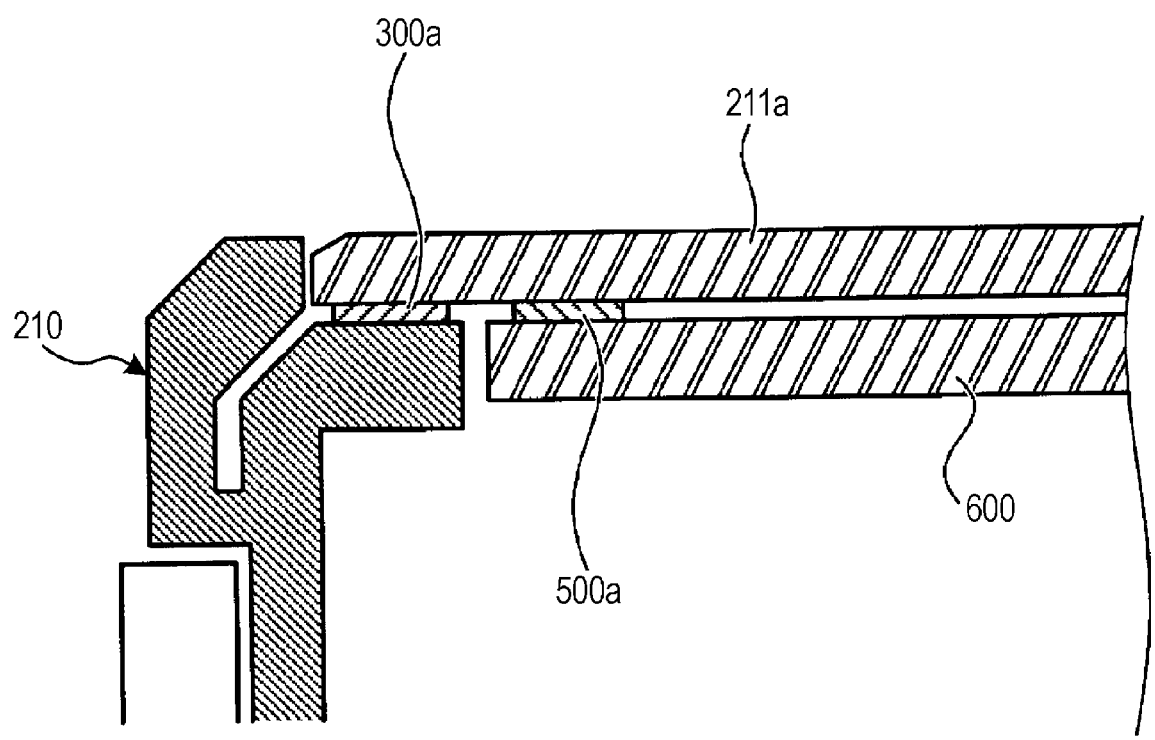
FIG. 1 is an enlarged cross-sectional view illustrating elements inside a movable side front case of a known mobile phone.
Figure 2:
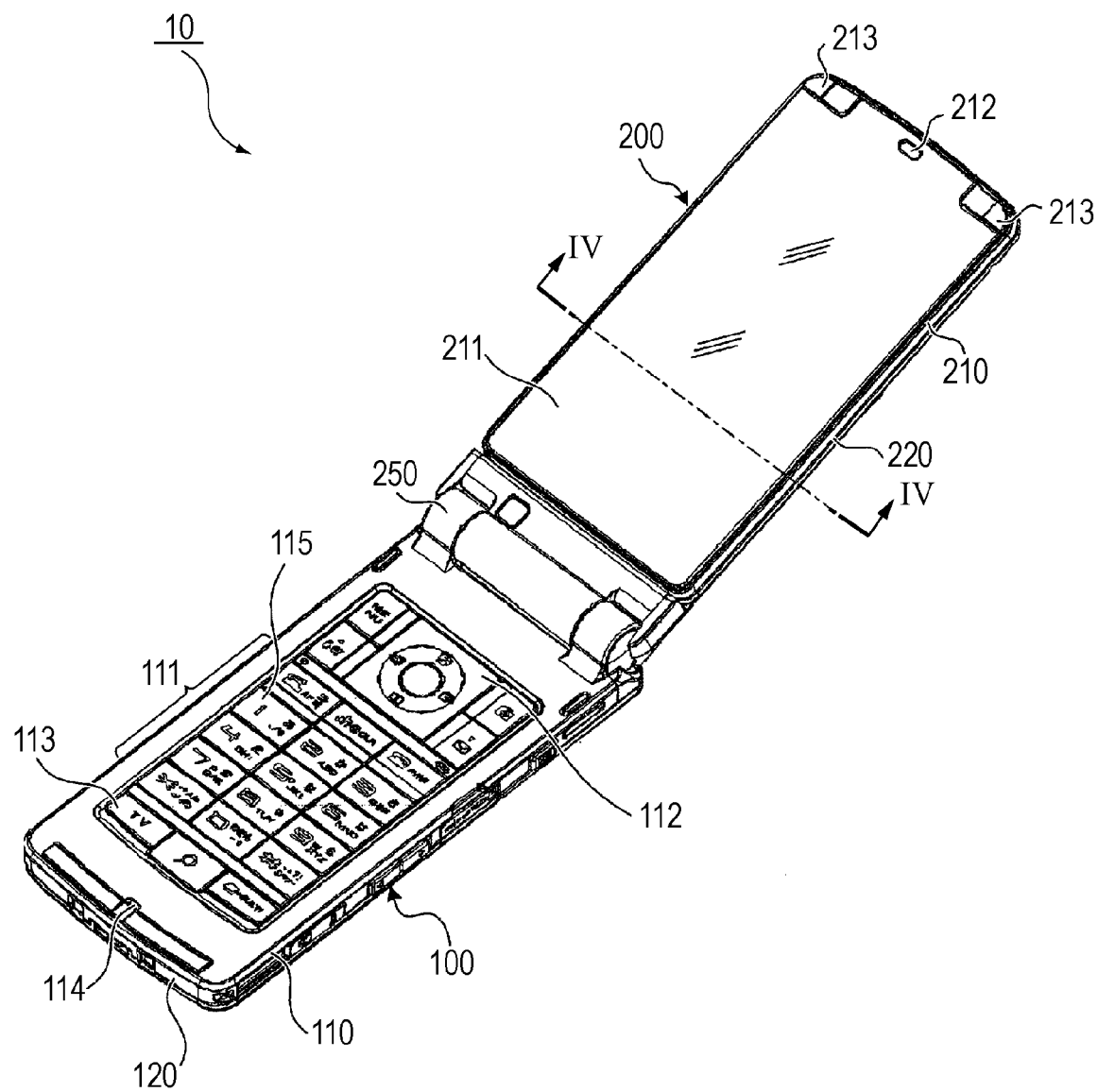
FIG. 2 illustrates an open state of a mobile phone according to a first embodiment.

An exemplary embodiment of a mobile terminal device is described in detail with reference to the drawings. A first exemplary embodiment is a mobile terminal device is applied to a mobile phone. [0019] FIG. 2 illustrates an open state of a mobile phone according to a first embodiment. A mobile phone 10 includes a palm-sized fixed side housing 100, a movable side housing 200, and a connecting hinge 250 that connects the fixed side housing 100 and the movable side housing 200.

The fixed side housing 100 can be for transmission use and include various operation keys such as a ten-key pad 111 including numeric keys on which numbers of 0 to 9 are written, and a function key 112 used for mode setting. The movable side housing 200 includes an LCD module 600 of substantially the same size as the fixed side housing 100. The fixed side housing 100 and the movable side housing 200 can be foldably connected to each other by the connecting hinge 250. The fixed side housing 100 and the movable side housing 200 each can have a box-like shape and can be made of magnesium alloy, for example, which is light and highly strong.

The fixed side housing 100 includes a two-section structure including a fixed side front case 110 on which an operation panel 115 having the operation keys including the ten-key pad 111 can be disposed, and a fixed side rear case 120 provided on the rear side, i.e., the lower side in FIG. 2.

The fixed side front case 110 can be provided with the ten-key pad 111, the function key 112, a videophone key 113, a mouthpiece 114 in which a microphone that converts the voice of a user of the mobile phone 10 into an electrical signal can be provided, and so forth. The cases 110 and 120 can be secured to each other at four positions with securing screws.

The movable side housing 200 includes a two-section structure including a movable side front case 210 and a movable side rear case 220 provided on the rear side, i.e., the lower side in FIG. 2. A large-sized LCD panel 211 through which the LCD module 600 is viewed can be disposed substantially in the center of the surface of the movable side front case 210.

An earpiece 212 through which the user of the mobile phone 10 hears the sound by putting the user's ear thereto can be provided at the upper end of the movable side front case 210. The cases 210 and 220 of the mobile phone 10 can be secured to each other at four positions with securing screws. Covers 213 for concealing some of the screws can be provided at the top of the LCD panel 211.

The mobile phone 10 according to the first embodiment includes a frame member 400 having substantially the same shape as an inner peripheral portion of the upper surface of the movable side front case 210 and integrally fitted to the movable side front case 210.

The LCD panel 211 can be secured by using a double-sided adhesive tape member 300, with one side of the double-sided tape adhesive member 300 being made to adhere to the upper surface of to the frame member 400 secured to the inner peripheral portion of the movable side front case 210. The movable side rear case 220 can be secured to the movable side front case 210 with a dust-proof sheet member 500 interposed between the upper surface of the LCD module 600 and the lower surface of the frame member 400. In this manner, the LCD panel 211 and the dust-proof sheet member 500 of the mobile phone 10 can be prevented from causing separation and loosening.

Figure 3:
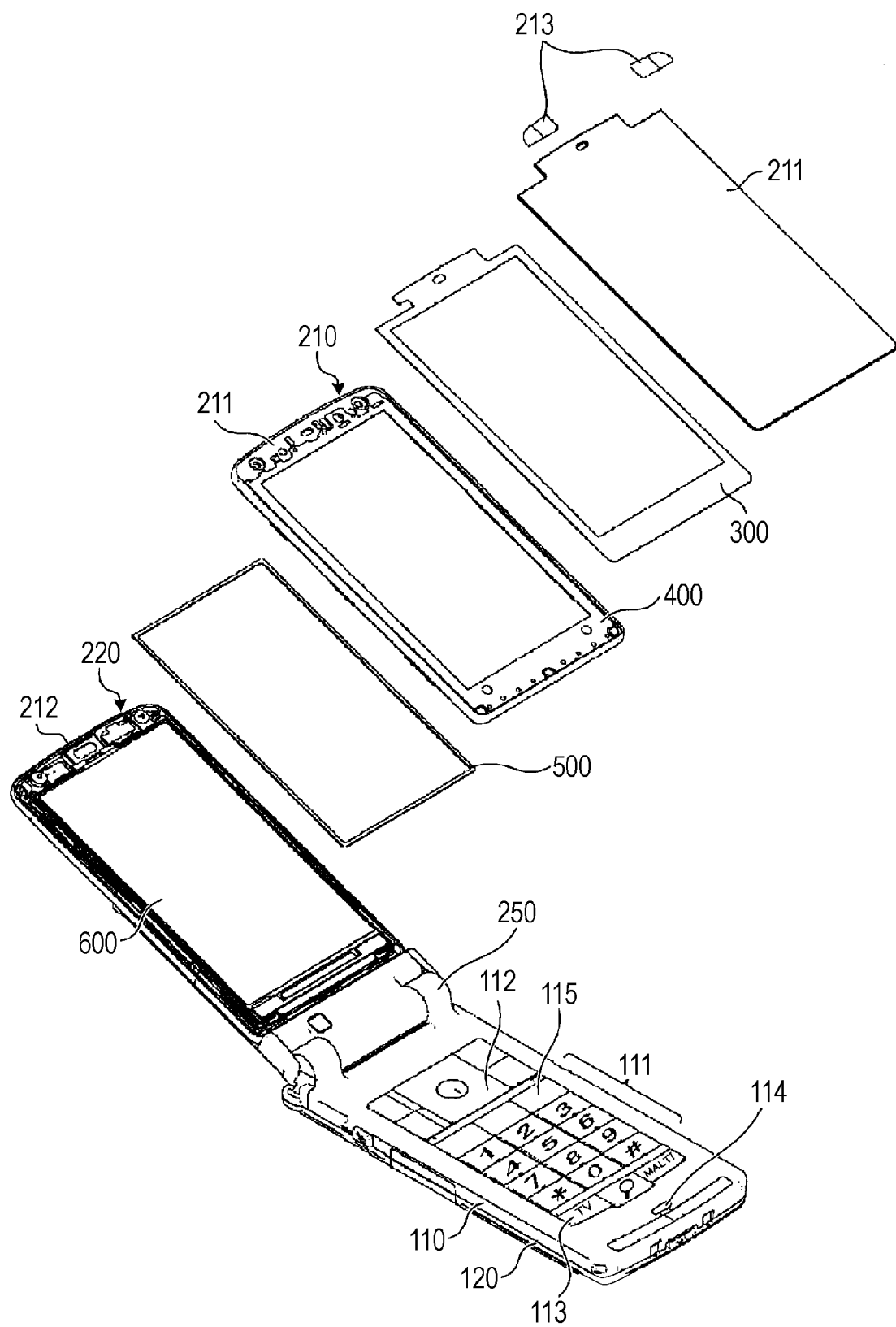
FIG. 3 illustrates an interior of a movable side front case included in movable side housing.
Figure 4:
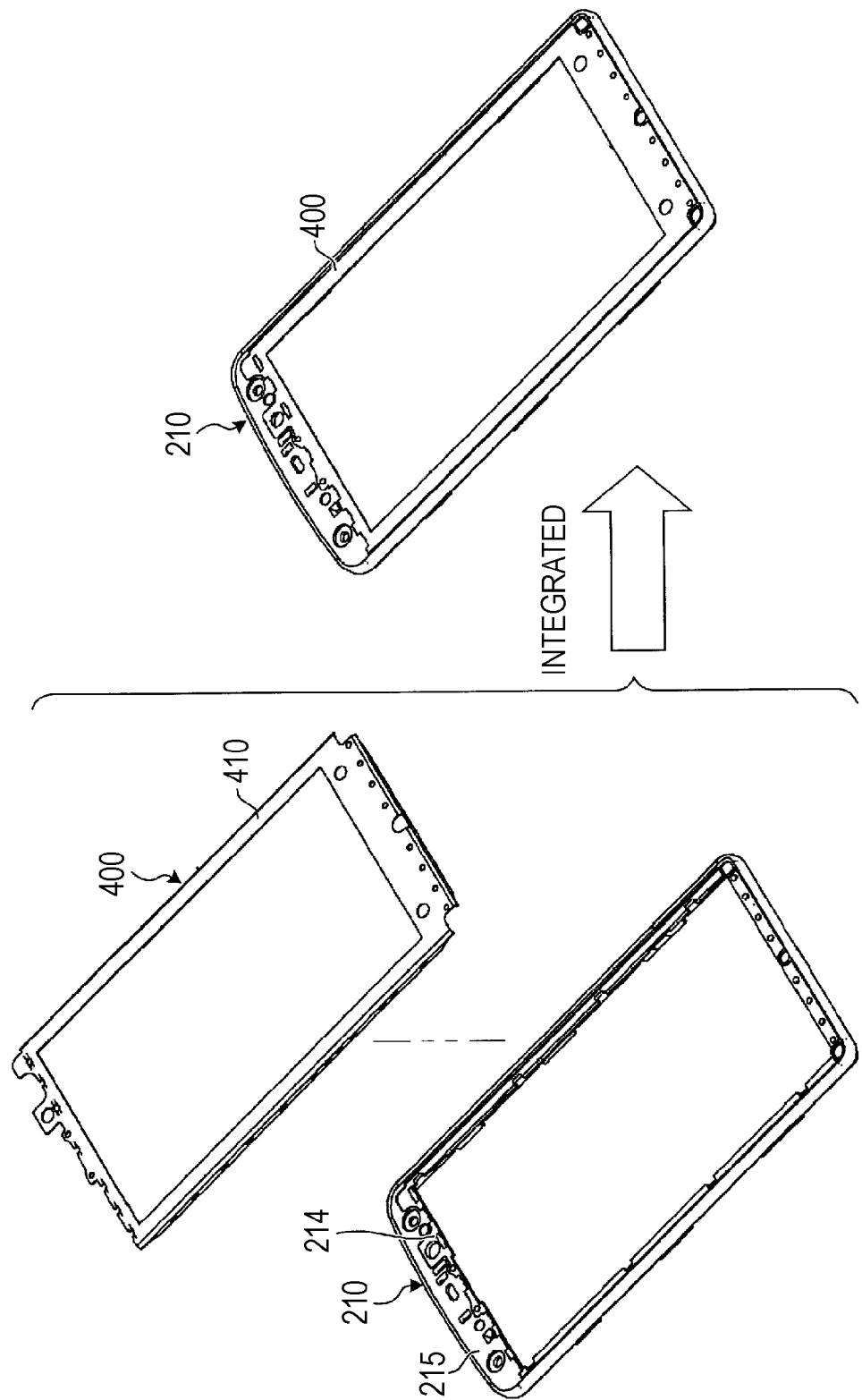
FIG. 4 illustrates an interior of the movable side front case.
Figure 5:
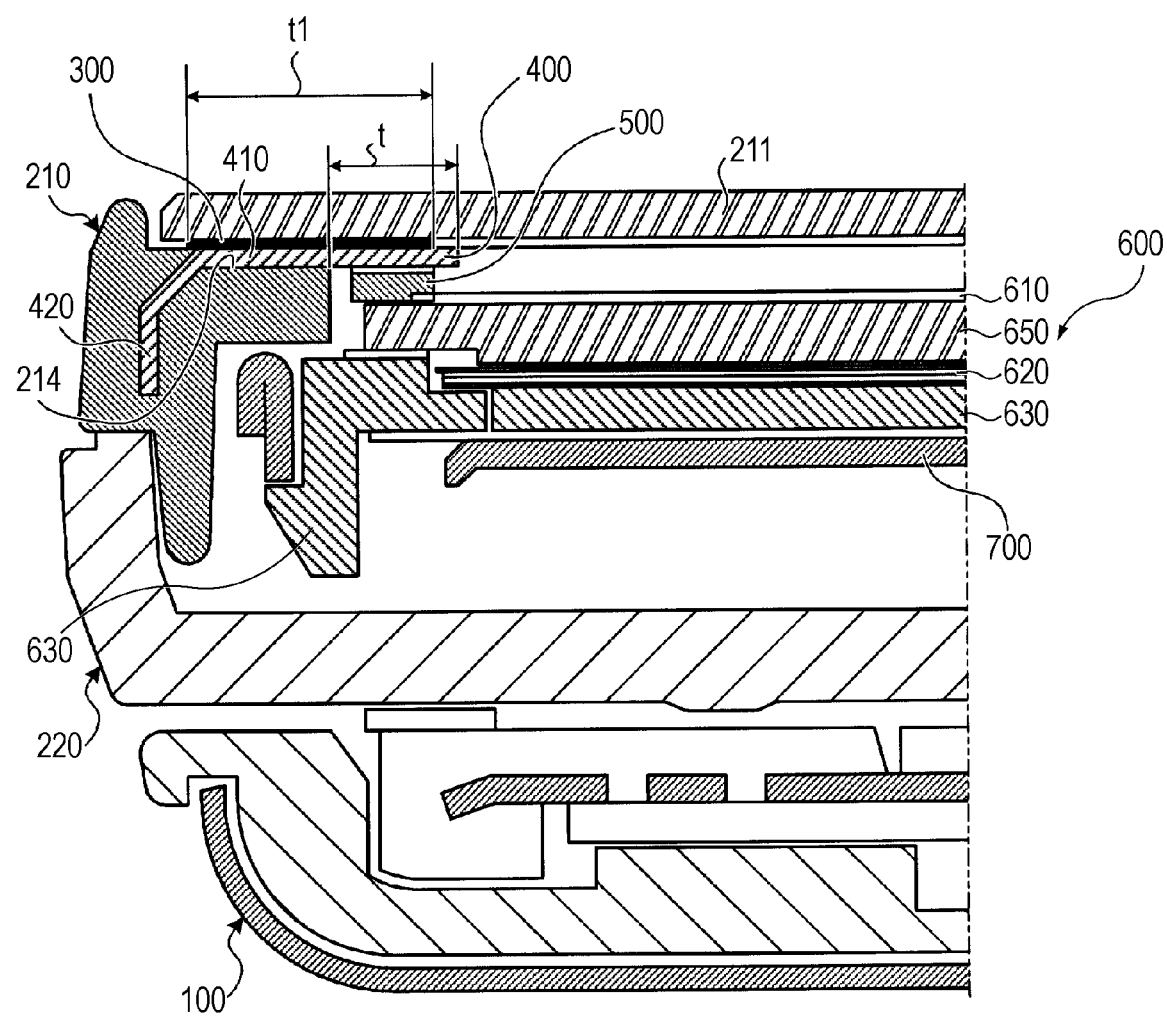
FIG. 5 is an enlarged cross-sectional view of elements illustrated in FIG. 2, taken along the line IV-IV.
Figure 6:
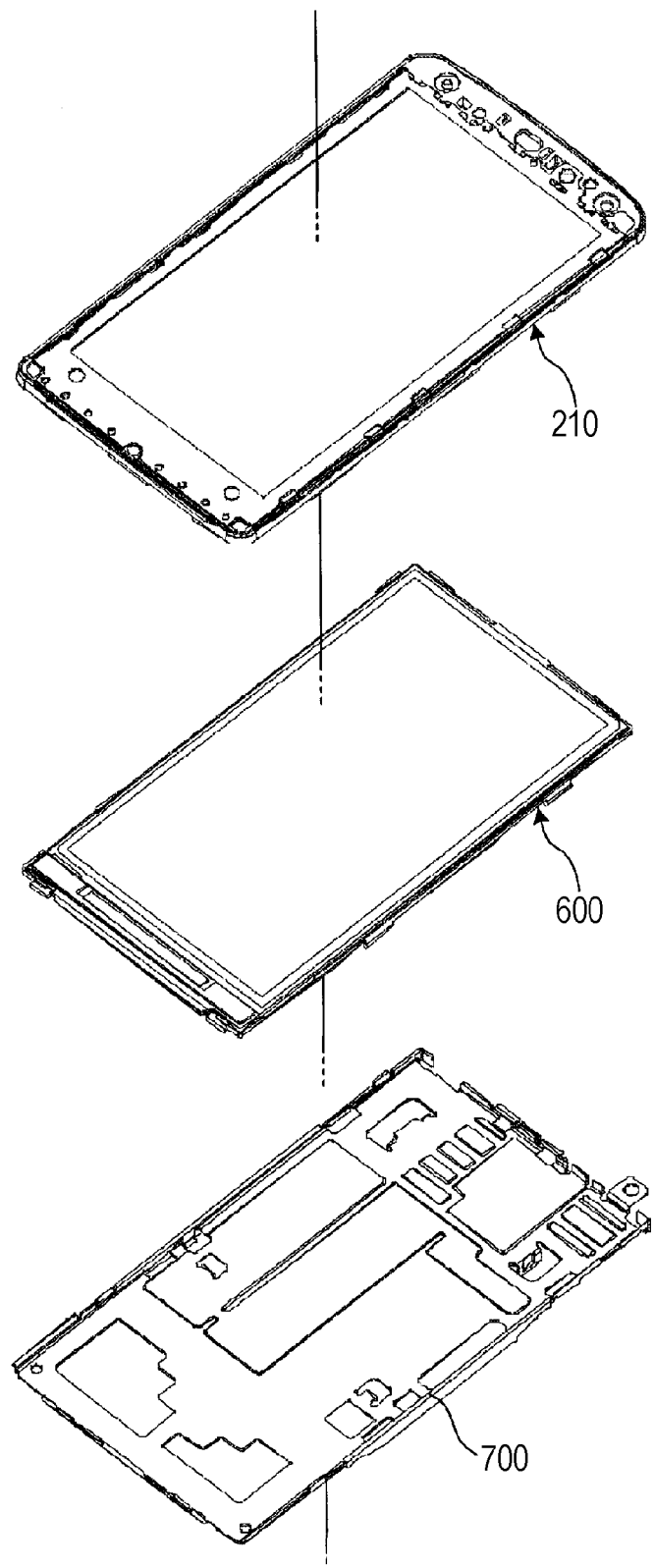
FIG. 6 is an exploded perspective top view of an LCD module.
Figure 7:
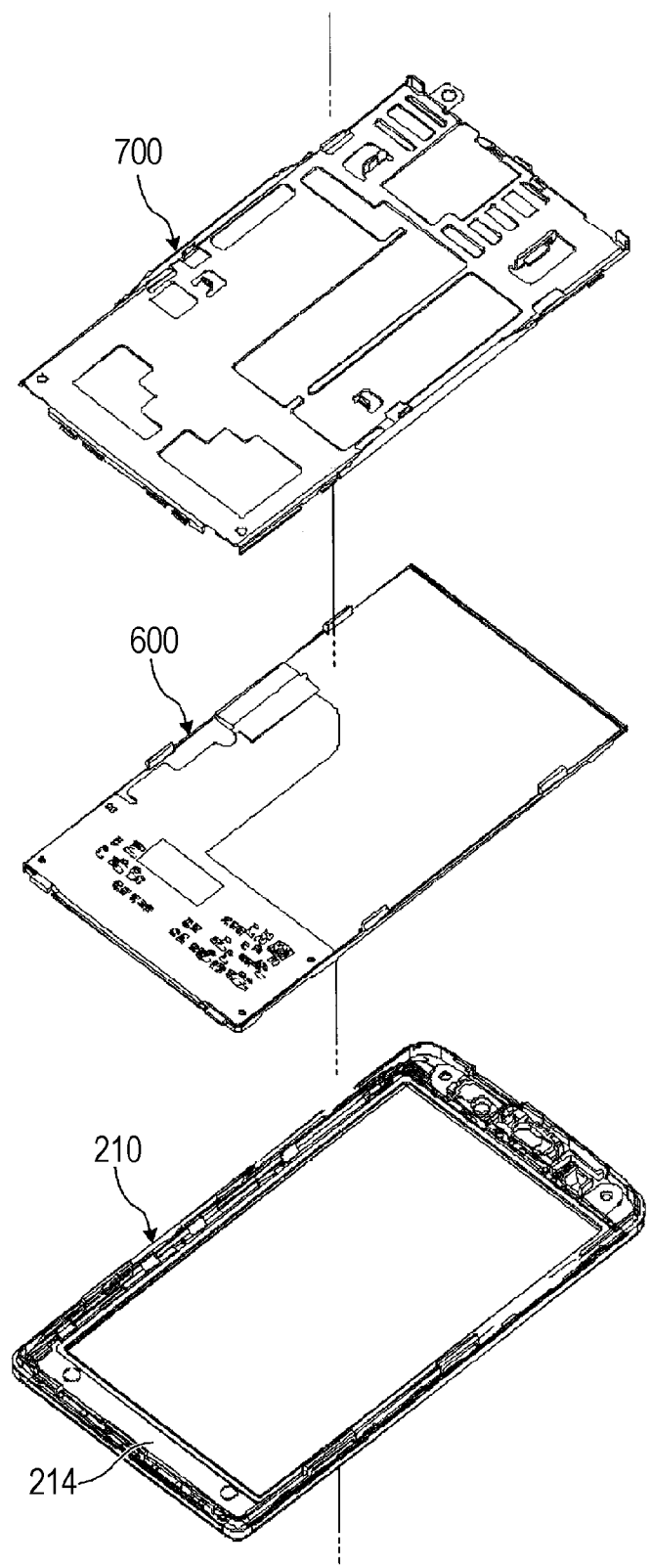
FIG. 7 is an exploded perspective bottom view of the LCD module.

The internal configuration of the mobile phone 10 according to a first embodiment is illustrated in FIGS. 3 to 7. FIG. 3 is an exploded perspective view illustrating the interior of a movable side front case included in movable side housing. FIG. 4 is an exploded perspective view illustrating the interior of the movable side front case. FIG. 5 is an enlarged cross-sectional view of relevant elements illustrated in FIG. 2, taken along the line IV-IV. FIG. 6 is an exploded perspective top view of an LCD module. FIG. 7 is an exploded perspective bottom view of the LCD module.

The movable side housing 200 includes the movable side rear case 220 having a box-like shape and the movable side front case 210 having a box-like shape and secured in such a manner as to engage with the movable side rear case 220 at the opening thereof. The movable side front case 210 houses, in order from the top in FIG. 3, the LCD panel 211, the LCD module 600, and an LCD-holding sheet metal 700.

The movable side front case 210 can be a casing in which the frame member 400 can be integrally provided to a body 215 of the movable side front case 210 in such a manner as to fit an inner peripheral portion 214 of the body 215.

The body of the frame member 400 includes a flat portion 410 extending in the longitudinal direction thereof and a bent portion 420 bent in a dogleg shape. Part of the flat portion 410 and the bent portion 420 can be embedded in the inner peripheral portion 214 of the movable side front case 210. In the mobile phone 10 of the first embodiment, the frame member 400 can extend beyond the end of the inner peripheral portion 214 of the movable side front case 210 by an area t. With the area t, the portion to which the double-sided adhesive tape member 300 can be made to adhere can be provided as a large area t1.

In the mobile phone 10 of and an exemplary first embodiment, the movable side front case 210 of the movable side housing 200 can be integrally provided with the frame member 400 having a small thickness. This thickness, which does not be realized with a resin member, can be realized with the sheet metal. The frame member 400 can be made of a stainless sheet metal, for example. In the mobile phone 10, it is easier to give a sufficient rigidity to the body than in the case of a resin body, whereby the strength of the body can be improved.

The mobile phone 10 includes the frame member 400. Therefore, the area of a portion of the LCD panel 211 to which the double-sided adhesive tape member 300 can be made to adhere can be increased, whereby separation and loosening of the LCD panel 211 can be assuredly prevented.

The dust-proof sheet member 500 can be made to adhere to the frame member 400 with the upper surface of the dust-proof sheet member 500 in contact with the lower surface of the flat portion 410. In the mobile phone 10 according to an exemplary embodiment, the dust-proof sheet member 500 for preventing dust from reaching the LCD module 600 can be provided on the back surface of the frame member 400.

Unlike a conventional case, the dust-proof sheet member 500 is not made to adhere to the back surface of the LCD panel 211, separation and loosening of the LCD panel 211 due to a compressive reaction force of the packing can be prevented.

The LCD module 600 includes an LCD 650, a polarizing plate 610 provided on the upper surface of the LCD 650, and a light-guiding plate 620 and a resin frame 630 both provided in that order on the lower surface of the LCD 650. The LCD-holding sheet metal 700 can be secured to the lower surface of the resin frame 630.

A mobile phone 10 according to an exemplary embodiment includes a movable side front case 210 and the frame member 400 having substantially the same shape as the inner peripheral portion of the movable side front case 210 and integrally fitted to the upper surface thereof. The LCD panel 211 can be secured by using the double-sided adhesive tape member 300, with one side of the double-sided adhesive tape member 300 being made to adhere to the upper surface of the frame member 400. The movable side rear case 220 can be secured to the movable side front case 210 with the dust-proof sheet member 500 interposed between the upper surface of the LCD module 600 and the lower surface of the frame member 400. Therefore, in the mobile phone 10 of an exemplary first embodiment, the LCD panel 211 can be prevented from being loosened and separated, and the rigidity of the LCD module 600 can be improved.

Figure 8:
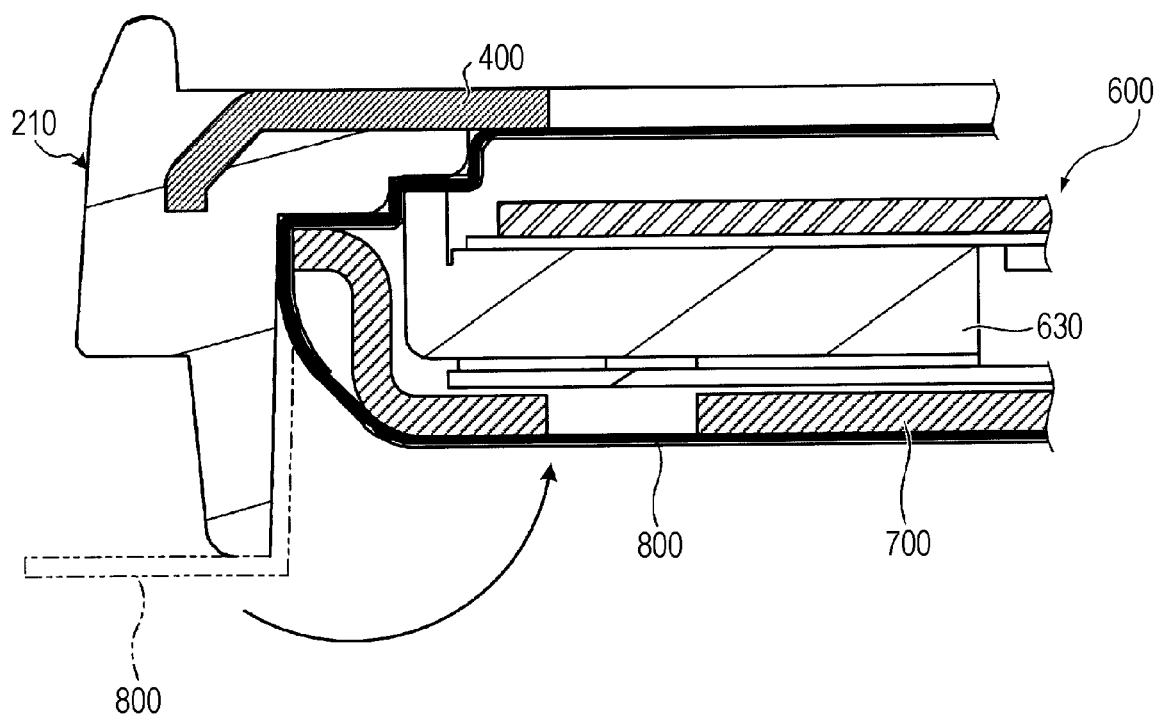
FIG. 8 is an enlarged cross-sectional view illustrating elements inside a movable side front case according to an embodiment.

A mobile phone 10 according to a second exemplary embodiment is illustrated in FIGS. 8 and 9. FIG. 8 is an enlarged cross-sectional view illustrating elements inside a movable side front case according to a second embodiment. FIG. 9 is a diagram illustrating positions where pieces of conductive tape can be provided.

The LCD module 600 disposed in the movable side front case 210 can be provided with pieces of conductive tape 800 that can be electrically conductive to the frame member 400. The pieces of conductive tape 800 can be provided at two sides, respectively, of the LCD-holding sheet metal 700.

As illustrated in FIG. 9, the pieces of conductive tape 800 can be provided at the bottom end of the movable side front case 210. The pieces of conductive tape 800 can be folded and made to adhere to the corresponding side of the LCD-holding sheet metal 700. The frame member 400 integrally fitted to the movable side front case 210 can be grounded by using the pieces of conductive tape 800.

In the mobile phone 10 of a second embodiment, since the LCD module 600 disposed in the movable side front case 210 can be provided with the pieces of conductive tape 800 electrically conductive to the frame member 400, the frame member 400 integrally fitted to the movable side front case 210 can be grounded. Thus, in the mobile phone 10 of a second embodiment, generation of static electricity can be assuredly prevented.

In a mobile terminal device according to an embodiment, the display panel can be secured by using the double-sided tape member, one side of which can be made to adhere to the upper surface of the frame member fitted to the inner peripheral portion of the movable side front case. Further, the movable side rear case can be secured to the movable side front case with the dust-proof sheet member interposed between the upper surface of the LCD module and the lower surface of the frame member. Therefore, the mobile terminal device of an embodiment can provide a larger area to which the double-sided tape member can be provided. This prevents the display panel from being loosened and separated. Moreover, in the mobile terminal device according to an embodiment, sufficient rigidity can be given by interposing the frame member, and damage to the movable side front case and the LCD module can be prevented.

While first and second exemplary embodiments concern an exemplary application of a mobile terminal device to a mobile phone that can be foldable at the connecting hinge, an embodiment can also be applied to any other mobile terminal devices having various hinge structures. For example, an embodiment can be applied to mobile terminal devices having connecting structures of sliding type and turning type.

While first and second exemplary embodiments concern an exemplary application of a mobile terminal device to a mobile phone, the embodiments are not limited thereto. The embodiments can also be applied to any other mobile terminal devices, including small-sized information-processing terminal devices such as personal digital assistants (PDA), small-sized music players, portable televisions, and portable game machines.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the spirit and scope and scope of the invention.

What is claimed is:

1. A mobile terminal device comprising:
   a housing including a front case and a rear case that houses an LCD module which includes an LCD and a resin frame provided on a lower surface of the LCD;
   a frame member integrally fitted to an inner peripheral portion of an upper surface of the front case;
   a display panel;
   a double-sided tape adhering the display panel to an inner peripheral portion of an upper surface of the frame member; and
   a dust-proof sheet member having one surface thereof in contact with an inner peripheral portion of a lower surface of the frame member,
   wherein the front case is secured to the rear case with the dust-proof sheet member provided therebetween in such a manner that the other surface of the dust-proof sheet member faces an upper surface of the LCD module.

2. The mobile terminal device according to claim 1, further comprising:
   adhesive layers provided on both surfaces of the dust-proof sheet member,
   wherein one of the adhesive layers adheres to the inner peripheral portion of the lower surface of the frame member, and the other adhesive layer adheres to part of the upper surface of the LCD module.

3. The mobile terminal device according to claim 1, wherein the frame member includes at least one end of a portion thereof that is fitted to the inner peripheral portion of the upper surface of the front case embedded in the front case.

4. The mobile terminal device according to claim 2, wherein a portion of the frame member that is fitted to the inner peripheral portion of the upper surface of the front case includes an extension extending in a longitudinal direction at least at an end opposite an end secured to the inner peripheral portion, an upper surface of the extension being in contact with a lower surface of the double-sided tape.

5. The mobile terminal device according to claim 1, wherein the LCD module is provided with a sheet-metal member electrically conductive to the frame member, the sheet-metal member being provided with one or more pieces of conductive tape for grounding use.

6. The mobile terminal device according to claim 1, wherein the frame member is made of stainless sheet metal.

7. The mobile terminal device according to claim 5, wherein the pieces of conductive tape are provided on both sides on an end of the sheet-metal member.

* * * * *